United States Patent
Tsukamoto

(10) Patent No.: US 10,550,241 B2
(45) Date of Patent: Feb. 4, 2020

(54) POLYTRIMETHYLENE TEREPHTHALATE COMPOSITION, POLYESTER FIBER, AND METHODS FOR PRODUCING THE SAME

(71) Applicant: Teijin Limited, Osaka-shi, Osaka (JP)

(72) Inventor: Ryoji Tsukamoto, Osaka (JP)

(73) Assignee: TEIJIN FRONTIER CO., LTD., Osaka (JP)

( * ) Notice: Subject to any disclaimer, the term of this patent is extended or adjusted under 35 U.S.C. 154(b) by 181 days.

(21) Appl. No.: 15/541,635

(22) PCT Filed: Jan. 13, 2016

(86) PCT No.: PCT/JP2016/050821
§ 371 (c)(1),
(2) Date: Jul. 5, 2017

(87) PCT Pub. No.: WO2016/117428
PCT Pub. Date: Jul. 28, 2016

(65) Prior Publication Data
US 2018/0265667 A1    Sep. 20, 2018

(30) Foreign Application Priority Data

Jan. 19, 2015   (JP) .................. 2015-007729

(51) Int. Cl.
| | | |
|---|---|---|
| C08K 3/22 | (2006.01) | |
| D01F 6/62 | (2006.01) | |
| C08J 3/205 | (2006.01) | |
| C08K 3/02 | (2006.01) | |
| D01D 1/02 | (2006.01) | |
| D01D 5/08 | (2006.01) | |
| D01F 1/04 | (2006.01) | |
| D01F 8/14 | (2006.01) | |

(52) U.S. Cl.
CPC .............. C08K 3/22 (2013.01); C08J 3/2053 (2013.01); C08K 3/02 (2013.01); D01D 1/02 (2013.01); D01D 5/08 (2013.01); D01F 1/04 (2013.01); D01F 6/62 (2013.01); D01F 8/14 (2013.01); C08J 2367/02 (2013.01); C08K 2003/026 (2013.01); C08K 2003/2241 (2013.01); C08K 2201/005 (2013.01); D10B 2331/04 (2013.01); D10B 2501/04 (2013.01)

(58) Field of Classification Search
CPC .............. C08K 3/22; C08K 3/11; C08K 3/02
See application file for complete search history.

(56) References Cited

U.S. PATENT DOCUMENTS 6,680,353 B1 * 1/2004 Kato .................. C08K 3/22
                                                         524/497

FOREIGN PATENT DOCUMENTS

| EP | 1 142 955 A1 | 10/2001 |
|---|---|---|
| JP | 05-132611 A | 5/1993 |
| JP | H05132611 * | 5/1993 |
| JP | 2006-022241 A | 1/2006 |
| JP | 2007-186629 A | 7/2007 |
| JP | 2008-248164 A | 10/2008 |
| JP | 2009-035572 A | 2/2009 |
| JP | 2009-091445 A | 4/2009 |
| JP | 2009-167541 A | 7/2009 |
| JP | 2009-221412 A | 10/2009 |
| JP | 2009-221620 A | 10/2009 |
| JP | 2010-132802 A | 6/2010 |
| WO | 99/011709 A1 | 3/1999 |
| WO | 00/026301 A1 | 5/2000 |

OTHER PUBLICATIONS

International Search Report for PCT/JP2016/050821 dated Apr. 5, 2016 [PCT/ISA/210].
Communication dated Dec. 7, 2017 from the European Patent Office in counterpart application No. 16740035.7.

* cited by examiner

*Primary Examiner* — Peter D. Mulcahy
(74) *Attorney, Agent, or Firm* — Sughrue Mion, PLLC

(57) ABSTRACT

A polytrimethylene terephthalate composition including a polyester having a trimethylene terephthalate unit as a main repeating unit, which satisfies all the following requirements: (a) the intrinsic viscosity is 0.50 to 1.60 dL/g; (b) titanium dioxide whose weight distribution of particles having a particle size of more than 1.0 μm is 5.0% by weight or less is contained in an amount of 0.05 to 3.0% by weight; (c) the crystallization exothermic peak top temperature is 165° C. or more; and (d) the half-width of the crystallization exothermic peak is 20° C. or less. In addition, the invention further encompasses a method for producing a polytrimethylene terephthalate composition using titanium dioxide that has been subjected to a wet-grinding treatment, and also a fiber obtained from the composition. The invention provides a polytrimethylene terephthalate composition, which stabilizes the process in the production of a fiber having small single-fiber fineness by melt-spinning, and is suitable for obtaining a fiber with reduced fluffing.

14 Claims, 1 Drawing Sheet

POLYTRIMETHYLENE TEREPHTHALATE COMPOSITION, POLYESTER FIBER, AND METHODS FOR PRODUCING THE SAME

CROSS REFERENCE TO RELATED APPLICATIONS

This application is a National Stage of International Application No. PCT/JP2016/050821 filed Jan. 13, 2016 (claiming priority based on Japanese Patent Application No. 2015-007729 filed Jan. 19, 2015), the contents of which are incorporated herein by reference in their entirety.

TECHNICAL FIELD

The present invention relates to a polytrimethylene terephthalate composition and a fiber. More specifically, the invention relates to a high-quality polytrimethylene terephthalate composition that is a small-fineness fiber containing titanium oxide particles; a fiber; and methods for producing the same.

BACKGROUND ART

Polyesters have excellent mechanical, physical, and chemical performance, and thus have been widely used for fibers, films, and other formed products. Among them, in recent years, attention has been paid to polytrimethylene terephthalate fibers for their soft texture, excellent elastic recovery, dyeability, and like characteristics that are not seen in conventional polyester fibers, such as polyethylene terephthalate fibers. Accordingly, they have been widely applied as fibers for carpets, brushes, and garments.

When synthetic fibers using polyesters including such polytrimethylene terephthalate, nylon, and the like are used for garment applications, generally, titanium dioxide is added as a delustering agent to suppress the luster of fibers. However, in the case where titanium dioxide is added to a polyester, due to the surface activity of inorganic particulate titanium dioxide, the polyester polymer is decomposed, resulting in problems such as a decrease in molecular weight. Then, single-fiber breakage occurs during spinning, for example, causing a decrease in the stability of the fiber production process. Other known problems include fluffing, the occurrence of variations in hue and cloth texture, and the like, resulting in the deterioration of the quality of the product. In particular, as compared with typical polyesters such as polyethylene terephthalate, polytrimethylene terephthalate has lower thermal stability. Accordingly, the adverse effects on the fiber production process caused by the presence of titanium dioxide inorganic particles are likely to be more prominent.

Methods for solving these problems with the production of polytrimethylene terephthalate fibers and the fiber quality have been proposed, including a method in which a removal operation, such as centrifugation or filtration, is performed to reduce aggregates of titanium oxide (see, e.g., PTL 1), a method in which a pre-prepared masterbatch of tributylene terephthalate and titanium dioxide is dispersed in polytrimethylene terephthalate (see, e.g., PTL 2), and the like. Use of these methods can certainly reduce aggregates of titanium dioxide and the like contained in a polytrimethylene terephthalate composition, and filter clogging during formation is reduced, leading to the stabilization of the fiber production process. However, in the production of fibers having small single-fiber fineness, the methods have yet been at an insufficient level in terms of quality, such as yarn breakage and fluffing.

In addition, as a method for increasing the crystallization exothermic peak top temperature of a polytrimethylene terephthalate composition in order to improve the polymer melt retention stability, a method in which an epoxy-group-containing polystyrene is added to polytrimethylene terephthalate has been proposed (see, e.g., PTL 3). However, in this method, the addition of polystyrene destabilizes the fiber production process. Further, in the case where dyeing is performed in a subsequent step, the addition also causes non-uniform dyeing of a cloth, etc. As another method for improving the thermal stability of polytrimethylene terephthalate, a method in which a phosphorus compound is added to polytrimethylene terephthalate to enhance the thermal stability has been proposed (see, e.g., PTL 4). According to this method, the thermal stability of polytrimethylene terephthalate is certainly improved, leading to the stabilization of the fiber production process. However, its improving effect has yet been insufficient.

CITATION LIST

Patent Literature

PTL 1: WO 00/26301
PTL 2: JP-A-2009-35572
PTL 3: JP-A-2007-186629
PTL 4: WO 99/11709

SUMMARY OF INVENTION

Technical Problem

An object of the invention is to provide a polytrimethylene terephthalate composition which stabilizes the process of melt-spinning in the production of a fiber having small single-fiber fineness, whereby high-quality fibers with less fluffing are obtained; a fiber; and methods for producing the same.

Solution to Problem

In order to solve the problems of the prior art described above, the present inventors have conducted extensive research, and, as a result, accomplished the invention.

That is, the invention is directed to a polytrimethylene terephthalate composition that includes a polyester having a trimethylene terephthalate unit as a main repeating unit and satisfies all the following requirements (a) to (d), as well as fibers obtained therefrom, according to which the above problems can be solved:

(a) the intrinsic viscosity is within a range of 0.50 to 1.60 dL/gl;

(b) titanium dioxide whose weight distribution of particles having a particle size of more than 1.0 μm in particle size distribution measurement using a laser diffraction/scattering particle size distribution analyzer is 5.0% by weight or less is contained in an amount of 0.05 to 3.0% by weight;

(c) the crystallization exothermic peak top temperature that appears when the polytrimethylene terephthalate composition heated to the melting point or higher is cooled at a rate of 10° C./min using a differential scanning calorimeter is 165° C. or more; and (d) the half-width of the crystallization exothermic peak that appears when the polytrimethylene terephthalate composition heated to the melting point or higher is cooled at a rate of 10° C./min using a differential scanning calorimeter is 20° C. or less.

Further, it is preferable that a phosphorus compound is contained in an amount of 3 to 100 ppm by weight as the amount of elemental phosphorus.

The invention is also directed to a polyester fiber composed of the polytrimethylene terephthalate composition described above, or a polyester composite fiber containing the polytrimethylene terephthalate composition described above as at least one component.

The invention is also directed to a method for producing a polyester fiber, characterized by including melt-spinning the polytrimethylene terephthalate composition described above.

The method for producing a polytrimethylene terephthalate composition according to another aspect of the invention is characterized in that titanium dioxide is subjected to a wet-grinding treatment to form a titanium dioxide slurry whose weight content of titanium dioxide particles having a particle size of more than 1.0 μm is 5.0% by weight or less, and then the titanium dioxide slurry is added to a polytrimethylene terephthalate composition having a trimethylene terephthalate unit as a main repeating unit, thereby making the titanium dioxide concentration in the composition 0.05 to 3.0% by weight, and the intrinsic viscosity of the polytrimethylene terephthalate composition after polymerization within a range of 0.50 to 1.60 dL/g.

Further, it is preferable that an organic titanium compound is used as a polymerization catalyst, the titanium dioxide has an average particle size within a range of 0.1 to 0.8 μm before the wet-grinding treatment, and the titanium dioxide slurry is obtainable by dispersing a powder of titanium dioxide in trimethylene glycol. It is still more preferable that in the method for producing a polytrimethylene terephthalate composition, using a differential scanning calorimeter, the crystallization exothermic peak top temperature that appears when the polytrimethylene terephthalate composition heated to the melting point or higher is cooled is controlled at 165° C. or more, while the half-width of the crystallization exothermic peak is controlled at 20° C. or less.

Advantageous Effects of the Invention

The invention makes it possible to obtain a polytrimethylene terephthalate composition which stabilizes the process of melt-spinning in the production of a fiber having small single-fiber fineness, whereby high-quality fibers with less fluffing are obtained; a fiber; and methods for producing the same.

DESCRIPTION OF EMBODIMENT

Figure 1:
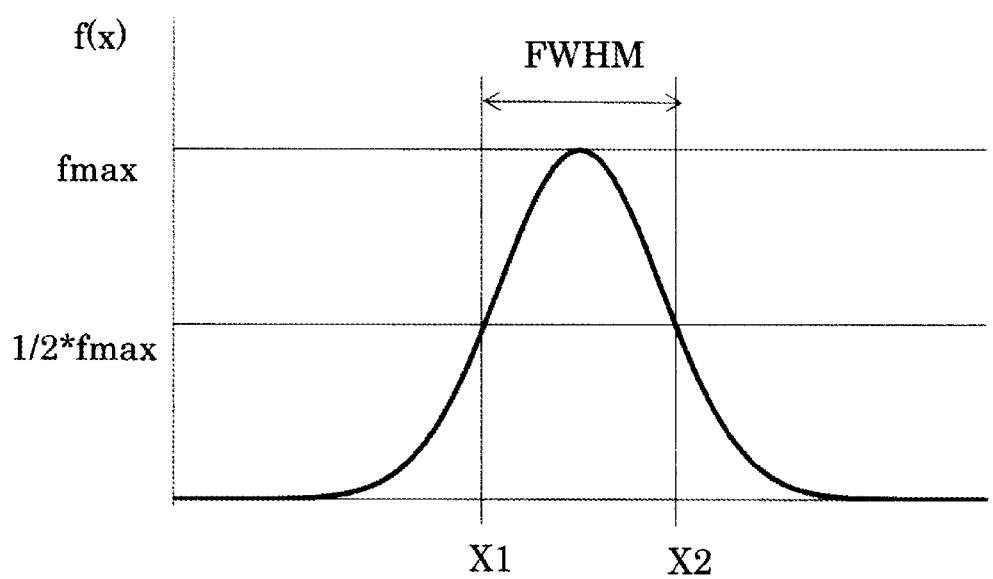
FIG. 1 is an explanatory view of the half-width of the crystallization exothermic peak that appears during cooling using a differential scanning calorimeter.

Hereinafter, the invention will be described in further detail.

The polyester used in the invention is a polyester including trimethylene terephthalate as a main repeating unit.

Here, "main repeating unit" means that 85 mol % or more, preferably 90 mol % or more, and more preferably 95 mol % or more, of the all repeating units forming the polyester are polyester including trimethylene terephthalate. The polyester may also be a polytrimethylene terephthalate copolymer copolymerized with a third component other than the component forming the trimethylene terephthalate unit.

Then, in the polytrimethylene terephthalate composition, it is indispensable that (a) the intrinsic viscosity is within a range of 0.50 to 1.60 dL/g. When the intrinsic viscosity is within above range, the finally obtained polyester fiber has sufficiently high mechanical strength and also even better handleability. It is still more preferable that the intrinsic viscosity is within a range of 0.60 to 1.50 dL/g, particularly preferably within a range of 0.70 to 1.40 dL/g. The intrinsic viscosity can be measured, using an Ubbelohde viscometer, by dissolving the polytrimethylene terephthalate composition in a suitable solvent as described below. In addition, in order for the polytrimethylene terephthalate composition to have an intrinsic viscosity within a suitable range, the reaction temperature, reaction time, and vacuum degree at the time of melt polycondensation are adjusted, and it is also preferable to perform solid-state polymerization in a nitrogen gas stream or vacuum at a temperature equal to or lower than the melting point of the polytrimethylene terephthalate composition, specifically within a range of 195 to 215° C.

Further, in the polytrimethylene terephthalate composition of the invention, it is necessary that (b) titanium dioxide whose weight distribution of particles having a particle size of more than 1.0 μm in particle size distribution measurement using a laser diffraction/scattering particle size distribution analyzer is 5.0% by weight or less is contained in an amount of 0.05 to 3.0% by weight. Specifically, "particles having a particle size of more than 1.0 μm" are preferably particles having a particle size of more than 1.0 μm and 20.0 μm or less, and the phrase more preferably refers to particles having a particle size of more than 1.0 μm and 15.0 μm or less.

With respect to the kind of titanium dioxide used in the invention, it may be in anatase form or rutile form, but is preferably in anatase form. The content of titanium dioxide is adjusted according to the intended use of the fiber. In the case where the fiber is used for garment applications, such as the surface and lining fabrics of general gentlemen's garments and women's garments, it is preferable that the titanium dioxide content is within a range of 0.1 to 1.0% by weight.

In addition, here, the titanium dioxide contained in the polytrimethylene terephthalate composition of the invention is characterized in that the content of particles having a particle size of more than 1.0 μm in particle size distribution measurement is 5.0% by weight or less. It is still more preferable that the content of particles having a particle size of more than 1.0 μm is within a range of 0.001 to 5.0% by weight. The content is more preferably within a range of 0.01 to 4.9% by weight, particularly preferably 0.02 to 3.0% by weight, and most preferably 0.03 to 2.0% by weight. When the content of particles having a particle size of more than 1.0 μm is within the above range, the filtration pressure in the spinneret is less likely to increase, and polyester fibers can be stably produced by a melt-spinning method continuously for a long period of time. In addition, fluffing of the obtained polyester fiber can be suppressed. The particle size distribution of titanium dioxide can be measured and evaluated using a laser diffraction/scattering particle size distribution analyzer as described below.

In order for the content of particles of more than 1.0 μm in titanium dioxide to be within a predetermined range, it is preferable to perform a wet-grinding treatment, which will be described below in detail. As the wet-grinding treatment, it is preferable to use a grinding device such as a bead mill, and further it is preferable to perform the wet-grinding treatment multiple times. In addition, it is preferable that the wet-grinding treatment is a circulating treatment, in which particles flow through the same path multiple times. Further, it is preferable that beads to serve as the grinding media are glass beads. In addition, when the diameter of the beads is too large, wet-grinding is insufficient, while when it is too small, even in the case where wet-grinding is performed multiple times, it tends to be difficult to obtain the effect. It is preferable that the diameter of the beads used is within a range of 0.6 to 1.4 mm, still more preferably within a range of 0.7 to 1.2 mm. Further, for the wet-grinding treatment of titanium dioxide, it is preferable that a powder of titanium dioxide is dispersed in trimethylene glycol to form a slurry.

Then, the titanium dioxide prepared such that the weight distribution of particles having a particle size of more than 1.0 μm is a predetermined value is mixed to a predetermined content in the polytrimethylene terephthalate composition.

Further, in the polytrimethylene terephthalate composition of the invention, it is necessary that the following requirements are both satisfied: (c) the crystallization exothermic peak top temperature that appears when the polytrimethylene terephthalate composition heated to the melting point or higher is cooled at a rate of 10° C./min using a differential scanning calorimeter is 165° C. or more; and (d) the half-width of the crystallization exothermic peak that appears when the polytrimethylene terephthalate composition heated to the melting point or higher is cooled at a rate of 10° C./min using a differential scanning calorimeter is 20° C. or less. When the crystallization exothermic peak top temperature is high, the heat resistance and melt stability are improved. When the half-width of the crystallization exothermic peak is small, the homogeneity of the polymer is improved, resulting in a high-quality polymer. It is still more preferable that the crystallization exothermic peak top temperature is within a range of 165 to 196° C., more preferably 167° C. to 195° C., and yet more preferably 170 to 190° C. In addition, it is preferable that the half-width of the crystallization exothermic peak is within a range of 2 to 20° C., more preferably 3 to 17° C., and still more preferably 5 to 15° C.

Here, the half-width refers to FWHM (full width at half maximum) in FIG. 1. More specifically, it is the absolute value of the difference between the points (X1, X2) where the half values (½*fmax) of the peak top value (fmax) intercept the function f(x). In FIG. 1, the y-axis shows the heat flow (W/g) on the chart of a differential scanning calorimeter, while the x-axis shows the temperature (° C.).

The polytrimethylene terephthalate composition of the invention satisfies all the above requirements (a) to (d). As a result, particularly in the process of fiber production by melt-spinning from the obtained polytrimethylene terephthalate composition, filter clogging during formation, yarn breakage during spinning, and the like are significantly reduced, whereby the quality of the finally obtained fiber is significantly improved. The invention is particularly effective in stabilizing the production in the process of continuously producing a thin fiber having a single-fiber fineness of 2.0 dtex or less. Further, the invention is effective for the production of fibers of 1.3 dtex or less, particularly within a range of 0.6 to 1.2 dtex. In the fiber obtained using the polytrimethylene terephthalate composition of the invention, fluffing can also be significantly suppressed without decreases in the tensile strength and tensile elongation values of the fiber.

Now, as described above, the polytrimethylene terephthalate composition of the invention may also be a polytrimethylene terephthalate copolymer copolymerized with a third component other than the component forming the trimethylene terephthalate unit. Then, the third component (copolymerization component) may be either of a dicarboxylic acid component and a glycol component.

Components suitable for use as a third component will be described in further detail.

Examples of dicarboxylic acid components include aromatic dicarboxylic acids such as phthalic acid, isophthalic acid, 2,6-naphthalenedicarboxylic acid, 2,7-naphthalenedicarboxylic acid, 1,4-naphthalenedicarboxylic acid, 1,5-naphthalenedicarboxylic acid, 1,6-naphthalenedicarboxylic acid, 2,5-naphthalenedicarboxylic acid, 4,4'-diphenyldicarboxylic acid, 4,4'-diphenoxyethanedicarboxylic acid, 4,4'-diphenylsulfonedicarboxylic acid, 3,4'-diphenylmethanedicarboxylic acid, 4,4'-diphenylmethanedicarboxylic acid, diphenylketonedicarboxylic acid, diphenylether-4,4'-dicarboxylic acid, diphenylthioether-4,4'-dicarboxylic acid, tetralindicarboxylic acid, and 6,6'-(alkylenedioxy)di-2-naphthoic acid. Examples of aliphatic dicarboxylic acids include aliphatic dicarboxylic acids such as oxalic acid, malonic acid, succinic acid, glutaric acid, adipic acid, pimelic acid, suberic acid, azelaic acid, sebacic acid, decanedicarboxylic acid, undecanedioic acid, dodecanedioic acid, tridecanedioic acid, tetradecanedioic acid, pentadecanedioic acid, hexadecanedioic acid, heptadecanedioic acid, octadecanedioic acid, nonadecanedioic acid, eicosanedioic acid, docosanedioic acid, fumaric acid, maleic acid, and itaconic acid. Examples of alicyclic dicarboxylic acids include alicyclic dicarboxylic acids such as 1,2-cyclohexanedicarboxylic acid, 1,3-cyclohexanedicarboxylic acid, 1,4-cyclohexanedicarboxylic acid, perhydronaphthalenedicarboxylic acid (decalindicarboxylic acid), dimer acid, cyclobutenedicarboxylic acid, tricyclodecanedicarboxylic acid, norbornanedicarboxylic acid, and adamantanedicarboxylic acid. They may also be anhydrides or derivatives. It is more preferable to use a single kind of, or two or more kinds of, these dicarboxylic acid components. It is preferable that the copolymerization proportion of these compounds in all the repeating units forming the polyester is 0 to 15 mol %, more preferably 1 to 10 mol %. Further, within a range of 1 to 5 mol %, a compound having three or more carboxyl groups in the molecule, such as trimellitic acid, trimesic acid, pyromellitic acid, gallic acid, or tricarballylic acid, may be also copolymerized.

Examples of glycol components (diol components), as the other component, suitable for use as a third component include ethylene glycol, 1,2-propylene glycol, tetramethylene glycol, pentamethylene glycol, hexamethylene glycol, heptamethylene glycol, octamethylene glycol, nonamethylene glycol, decamethylene glycol, undecamethylene glycol, dodecamethylene glycol, tridecamethylene glycol, tetradecamethylene glycol, pentadecamethylene glycol, hexadecamethylene glycol, neopentyl glycol, diethylene glycol, triethylene glycol, tetraethylene glycol, dipropylene glycol, di(trimethylene) glycol, tripropylene glycol, tris(trimethylene) glycol, tetrapentylene glycol, polyethylene glycol, polytetramethylene glycol, 2,2-diethyl-1,3-propanediol, 2-ethyl-2-butyl-1,3-propanediol, 2,2,4-trimethyl-1,3-pentanediol, 1,1-dihydroxycyclohexane, 1,2-dihydroxycyclohexane, 1,3-dihydroxycyclohexane, 1,4-dihydroxycyclohexane, 1,1-cyclohexanedimethanol, 1,2- cyclohexanedimethanol, 1,3-cyclohexanedimethanol, 1,4-cyclohexanedimethanol, p-(2-hydroxyethoxy)benzene, p-(3-hydroxyproxy)benzene, 4,4'-(2-hydroxyethoxy)biphenyl, 4,4'-(3-hydroxypropoxy)biphenyl, 2,2-bis(4-β-hydroxyethoxyphenyl)propane, 2,2-bis(4-γ-hydroxypropoxyphenyl)propane, bis(4-β-hydroxyethoxyphenyl)sulfone, bis(4-γ-hydroxypropoxyphenyl)sulfone, bis(4-β-hydroxyethoxyethoxyphenyl)sulfone, an ethylene oxide adduct of hydrogenated bisphenol A (2,2-bis(4-β-hydroxyethoxycyclohexyl)propane), a propylene oxide adduct of hydrogenated bisphenol A (2,2-bis(4-γ-hydroxypropoxycyclohexyl)propane), an ethylene oxide adduct of hydrogenated bisphenol S (bis(4-β-hydroxyethoxycyclohexyl)sulfone), a propylene oxide adduct of hydrogenated bisphenol S (bis(4-γ-hydroxypropoxycyclohexyl)sulfone), 2,2,4,4-tetramethyl-1,3-cyclobutanediol, adamantanediol, spiroglycol, and tricyclo[5.2.1.02,6]decanedimethanol. As the diol component other than the above two kinds, it is more preferable to use a single kind of, or two or more kinds of, these compounds. Further, it is also possible that a compound having three or more hydroxyl groups in the molecule, such as pentaerythritol or tetrakis(hydroxymethyl)methane, is copolymerized in a proportion of 0 to 15 mol % relative to 100% of all the repeating units forming the polyester.

The method for producing polytrimethylene terephthalate before the addition of titanium dioxide for use in the invention is not particularly limited, and it is possible to employ a method in which terephthalic acid is directly esterified with trimethylene glycol and then polymerized by melt polymerization, or a method in which an ester-forming derivative of terephthalic acid is subjected to a transesterification reaction with trimethylene glycol and then polymerized by melt polymerization. In the case of either method, generally, trimethylene glycol is added at an equimolar or higher ratio to terephthalic acid or an ester-forming derivative thereof, and excess trimethylene glycol is distilled off under reduced pressure in the polymerization reaction process. Here, the ester-forming derivative is a $C_{1-6}$ lower dialkyl ester, a $C_{6-8}$ lower diaryl ester, or a diacid halide. More specifically, examples thereof include dimethyl ester, diethyl ester, di-n-propyl ester, di-iso-propyl ester, di-n-butylester, di-sec-butylester, di-tert-butyl ester, dipentyl ester, dihexyl ester, diphenyl ester, dibenzyl ester, dinaphthyl ester, aromatic dicarboxylic acid dichloride, aromatic dicarboxylic acid dibromide, and aromatic dicarboxylic acid diiodide. Further, in these $C_{1-6}$ dialkyl esters and $C_{6-10}$ diaryl esters, one or more hydrogen atoms may be substituted with a halogen atom, an alkyl ether group, an aryl ether group, an alkyl ester group, an aryl ester group, an alkylcarbonyl group such as an acetyl group, or an arylcarbonyl group such as a benzoyl group.

As the polymerization catalyst for a polyester used in the polytrimethylene terephthalate production process of the invention, in terms of reducing foreign substances from the catalyst, it is preferable to use an organic titanium compound soluble in the polymer. As such titanium compounds, titanium compounds used as polycondensation catalysts for a polyester, such as titanium acetate and tetraalkoxytitaniums, can be mentioned. However, in terms of reactivity and handleability, tetraalkoxytitaniums are preferable, and tetramethoxytitanium, tetraethoxytitanium, tetra-n-propoxytitanium, tetraisopropoxytitanium, tetra-n-butoxytitanium, tetraisobutoxytitanium, tetra-sec-butoxytitanium, tetra-tert-butoxytitanium, tetrapentyloxytitanium, tetrahexyloxytitanium, tetraheptyloxytitanium, and tetraphenoxytitanium are more preferable. Among them, it is particularly preferable to select tetra-n-butoxytitanium or tetraisopropoxytitanium. With respect to the content of the titanium compound, in terms of polycondensation reactivity and the hue and heat resistance of the resulting polyester, it is preferable that the content as elemental titanium metal is about 2 to 150 mmol % relative to all the dicarboxylic acid components forming polytrimethylene terephthalate.

Here, in the case where, for example, a method in which an ester-forming derivative of terephthalic acid, such as dimethyl terephthalate, is subjected to a transesterification reaction with trimethylene glycol and then polymerized is employed, it is possible to use a catalyst that is usually used as a transesterification catalyst for a polyester, such as a calcium compound, a magnesium compound, a manganese compound, or a zinc compound, as a transesterification catalyst. However, usually, it is preferable to employ a method in which the titanium compound described above is used to serve as both a transesterification catalyst and a polymerization catalyst. In addition, in the case where a method in which terephthalic acid is directly esterified with trimethylene glycol and then polymerized is employed, the titanium compound described above alone is sufficient as a catalyst. However, generally, it is preferable to employ a method in which terephthalic acid and trimethylene glycol are subjected to a direct esterification reaction in the absence of a catalyst, and then the titanium compound is added as a polymerization catalyst to the obtained reaction mixture.

It is preferable that the polytrimethylene terephthalate composition of the invention has an elemental phosphorus content of 3 to 100 ppm by weight. It is more preferable that a phosphorus compound is contained in an amount of 3 to 100 ppm by weight as the amount of elemental phosphorus. The phosphorus compound is not particularly limited, but is preferably an organic phosphorus compound, and more preferably a phosphate compound, a phosphonic acid compound, or a phosphinic acid compound. More specifically, examples of phosphonic acid compounds include alkylphosphonic acids, arylphosphonic acids, and benzylphosphonic acids. Specific examples of alkylphosphonic acids include methylphosphonic acid, ethylphosphonic acid, n-propylphosphonic acid, tert-butylphosphonic acid, n-pentylphosphonic acid, iso-pentylphosphonic acid, n-hexylphosphonic acid, iso-hexylphosphonic acid, heptylphosphonic acid, octylphosphonic acid, nonylphosphonic acid, decylphosphonic acid, undecylphosphonic acid, and dodecylphosphonic acid. Specific examples of arylphosphonic acids include phenylphosphonic acid, methylphenylphosphonic acid, dimethylphenylphosphonic acid, trimethylphenylphosphonic acid, tetramethylphenylphosphonic acid, pentamethylphenylphosphonic acid, ethylphenylphosphonic acid, methylethylphenylphosphonic acid, diethylphenylphosphonic acid, monomethyldiethylphenylphosphonic acid, dimethyldiethylphenylphosphonic acid, triethylphenylphosphonic acid, propylphenylphosphonic acid, methylpropylphenylphosphonic acid, dimethylpropylphenylphosphonic acid, ethylpropylphenylphosphonic acid, dipropylphenylphosphonic acid, butylphenylphosphonic acid, methylbutylphenylphosphonic acid, ethylbutylphenylphosphonic acid, dimethylbutylphenylphosphonic acid, pentylphenylphosphonic acid, methylpentylphenylphosphonic acid, hexylphenylphosphonic acid, naphthylphosphonic acid, methylnaphthylphosphonic acid, dimethylnaphthylphosphonic acid, ethylnaphthylphosphonic acid, and benzylphosphonic acid. In addition, examples of phosphinic acid compounds include monomethylphosphinic acid, monoethylphosphinic acid, monopropylphosphinic acid, monobutylphosphinic acid, monohexylphosphinic acid, monophenylphosphinic acid, mono-4- methylphenylphosphinic acid, mono-1-naphthylphosphinic acid, mono-2-naphthylphosphinic acid, dimethylphosphinic acid, diethylphosphinic acid, dipropylphosphinic acid, dibutylphosphinic acid, dihexylphosphinic acid, diphenylphosphinic acid, di-4-methylphenylphosphinic acid, di-1-naphthylphosphinic acid, and di-2-naphthylphosphinic acid. Among them, phosphates such as trimethyl phosphate, triethyl phosphate, tripropyl phosphate, tributyl phosphate, tripentyl phosphate, trihexyl phosphate, tris(2-hydroxyethyl) phosphate, tris(3-hydroxypropyl) phosphate, tris(2-hydroxypropyl) phosphate, tris(hydroxybutyl) phosphate, and triphenyl phosphate are still more preferable.

It is more preferable that the amount of the phosphorus compound in the polytrimethylene terephthalate composition of the invention is, as the amount of elemental phosphorus, within a range of 5 to 70 ppm by weight, still more preferably within a range of 7 to 50 ppm by weight, and yet more preferably within a range of 8 to 30 ppm by weight. The amount of elemental phosphorus can be measured, using a fluorescent X-ray device, from a formed article obtained by melting a polytrimethylene terephthalate composition, followed by injection melt molding, as described below. Here, with respect to the timing of adding the phosphorus compound to the polytrimethylene terephthalate composition of the invention, the addition may be made at any stage from the initial stage before the start of the esterification reaction or transesterification reaction to the completion of the polymerization reaction. However, it is preferable that the addition is made between the initial stage before the start of the esterification reaction or transesterification reaction and the start of the polymerization reaction, and it is more preferable that the addition is made after the completion of the transesterification reaction of an ester-forming derivative of terephthalic acid and trimethylene glycol, or after the completion of the direct esterification reaction between terephthalic acid and trimethylene glycol, and before the start of the polymerization reaction.

Then, the polyester fiber of the invention is a fiber composed of the polytrimethylene terephthalate composition of the invention described above. Further, the polyester composite fiber of the invention is a composite fiber containing the polytrimethylene terephthalate composition of the invention as at least one component.

In the production process of melt-spinning the polytrimethylene terephthalate composition that serves as a raw material for these fibers of the invention, filter clogging during formation, yarn breakage during spinning, and the like are significantly reduced. Accordingly, the quality of the finally obtained polyester fiber or polyester composite fiber of the invention is significantly improved. In particular, the fibers of the invention are particularly effective when they have a single-fiber fineness of 2.0 dtex or less, further 1.3 dtex or less, and particularly within a range of 0.6 to 1.2 dtex. In the polyester fiber or polyester composite fiber of the invention, fluffing is also be significantly suppressed without decreases in the tensile strength and tensile elongation values thereof.

Another aspect of the invention is a method for producing a polytrimethylene terephthalate composition used for the production of such a fiber. Then, the production method of the invention is characterized in that titanium dioxide is subjected to a wet-grinding treatment to form a titanium dioxide slurry whose weight content of titanium dioxide particles having a particle size of more than 1.0 µm is 5.0% by weight or less, and then the titanium dioxide slurry is added to a polytrimethylene terephthalate composition having a trimethylene terephthalate unit as a main repeating unit, thereby making the titanium dioxide concentration in the composition 0.05 to 3.0% by weight, and the intrinsic viscosity of the polytrimethylene terephthalate composition after polymerization within a range of 0.50 to 1.60 dL/g.

Here, the method for producing a polytrimethylene terephthalate composition before the addition of a titanium dioxide slurry for use in the production method of the invention is not particularly limited, and it is possible to employ, as described above, a method in which terephthalic acid is directly esterified with trimethylene glycol and then polymerized by melt polymerization, or a method in which an ester-forming derivative of terephthalic acid is subjected to a transesterification reaction with trimethylene glycol and then polymerized by melt polymerization.

Then, in the production method of the invention, it is necessary that titanium dioxide is subjected to a wet-grinding treatment to form a titanium dioxide slurry whose weight content of titanium dioxide particles having a particle size of more than 1.0 µm is 5.0% by weight or less. It is still more preferable that the wet-grinding treatment is performed multiple times, particularly preferably 2 to 3 times. In addition, it is preferable that the wet-grinding treatment is a circulating treatment, in which particles flow through the same path multiple times. This is because the treatment path is more complicated compared with intermittent batch processing. In addition, here, "particles having a particle size of more than 1.0 µm" are specifically particles having a particle size of more than 1.0 µm and 20.0 µm or less, and the phrase more preferably refers to particles having a particle size of more than 1.0 µm and 15.0 µm or less. With respect to the kind of titanium dioxide used in the invention, it may be in anatase form or rutile form, but is preferably in anatase form.

In addition, as the wet-grinding treatment, it is preferable to use a grinding device such as a bead mill, and further it is preferable to perform the wet-grinding treatment multiple times. Further, it is preferable that beads to serve as the grinding media are glass beads. In addition, when the diameter of the beads is too large, wet-grinding is insufficient, while when it is too small, even in the case where wet-grinding is performed multiple times, it tends to be difficult to obtain the effect. It is preferable that the diameter of the beads used is within a range of 0.6 to 1.4 mm, still more preferably within a range of 0.7 to 1.2 mm. Further, for the wet-grinding treatment of a powder of titanium dioxide, it is preferable that the powder is dispersed in trimethylene glycol to form a slurry.

More specifically, a method in which a slurry pre-prepared by dispersing a powder of titanium dioxide in trimethylene glycol is wet-ground in a grinding device, such as a bead mill, is preferable. At this time, it is preferable that the weight proportion of titanium dioxide in the slurry is within a range of 10 to 70% by weight. The weight proportion is still more preferably within a range of 15 to 60% by weight, particularly preferably 20 to 50% by weight. When the concentration is too high, sufficient grinding is difficult, while a concentration that is too low results in inefficiency.

In addition, it is preferable that the average particle size of titanium dioxide before the wet-grinding treatment, that is, before formed into a titanium dioxide slurry, is within a range of 0.1 to 0.8 µm. Then, it is preferable that the ratio of the diameter of beads used for the wet-grinding treatment to the diameter of titanium oxide to be treated is within a range of 2,000 to 4,000, particularly 2,500 to 3,500.

Then, as the wet-grinding treatment conditions, it is preferable that the treatment temperature is within a range of 55 to 65° C. In addition, it is preferable that the rotation speed during the treatment is within a range of 2,500 to 3,500 ppm.

Then, titanium dioxide used in the method for producing a polytrimethylene terephthalate composition of the invention is configured such that the content of particles having a particle size of more than 1.0 μm in particle size distribution measurement is 5.0% by weight or less. It is still more preferable that the content of particles having a particle size of more than 1.0 μm is within a range of 0.001 to 5.0% by weight. The content is more preferably within a range of 0.01 to 4.9% by weight, particularly preferably 0.02 to 3.0% by weight, and most preferably 0.03 to 2.0% by weight. When the content of particles having a particle size of more than 1.0 μm is within the above range, the filtration pressure in the spinneret is less likely to increase during fiber production, and polyester fibers can be stably produced by a melt-spinning method continuously for a long period of time. In addition, fluffing of the obtained polyester fiber can be suppressed. The measurement and evaluation of the particle size distribution of titanium dioxide is a value obtained using a laser diffraction/scattering particle size distribution analyzer.

The titanium dioxide slurry prepared such that the weight distribution of particles having a particle size of more than 1.0 μm is a predetermined value is then added to a polytrimethylene terephthalate composition having a trimethylene terephthalate unit as a main repeating unit, and mixed to a titanium dioxide concentration of 0.05 to 3.0% by weight in the composition. Further, the content of titanium dioxide is adjusted according to the intended use of the fiber. In the case where the fiber is used for garment applications, such as the surface and lining fabrics of general gentlemen's garments and women's garments, it is preferable that the titanium dioxide content is within a range of 0.1 to 1.0% by weight.

In addition, here, the timing of adding the titanium dioxide to polytrimethylene terephthalate is not particularly limited. However, it is preferable that the addition is made after the completion of the transesterification reaction of an ester-forming derivative of terephthalic acid and trimethylene glycol, or after the completion of the direct esterification reaction between terephthalic acid and trimethylene glycol. In addition, it is also possible that polytrimethylene terephthalate that has reached a sufficient intrinsic viscosity value and the titanium dioxide are kneaded using a facility such as a single-screw or twin-screw extruder.

Then, according to the method for producing a polytrimethylene terephthalate composition of the invention, the polytrimethylene terephthalate composition having added thereto such a titanium dioxide slurry is made to have an intrinsic viscosity after polymerization within a range of 0.50 to 1.60 dL/g. When the intrinsic viscosity is within above range, the polyester fiber finally obtained using the polyester composition has sufficiently high mechanical strength and also even better handleability. It is still more preferable that the intrinsic viscosity is within a range of 0.60 to 1.50 dL/g, particularly preferably within a range of 0.70 to 1.40 dL/g. The intrinsic viscosity can be measured, using an Ubbelohde viscometer, by dissolving the polytrimethylene terephthalate composition in a suitable solvent as described below. In addition, in order for the polytrimethylene terephthalate composition to have an intrinsic viscosity within a suitable range, the reaction temperature, reaction time, and vacuum degree at the time of melt polycondensation are adjusted, and it is also preferable to perform solid-state polymerization in a nitrogen gas stream or vacuum at a temperature equal to or lower than the melting point of the polytrimethylene terephthalate composition, specifically within a range of 195 to 215° C.

In addition, in the method for producing a polytrimethylene terephthalate composition of the invention, it is preferable that the organic titanium compound described above is used as a polymerization catalyst. Organic titanium compounds soluble in the polymer are preferable, which are effective particularly in terms of reducing foreign substances from the catalyst. Among them, it is particularly preferable to select tetra-n-butoxytitanium or tetraisopropoxytitanium as the titanium compound. With respect to the titanium compound content, in terms of polycondensation reactivity and the hue and heat resistance of the resulting polyester, it is preferable that the content as elemental titanium metal is about 2 to 150 mmol % relative to all the dicarboxylic acid components forming polytrimethylene terephthalate.

Further, in the method for producing a polytrimethylene terephthalate composition of the invention, it is preferable that the crystallization exothermic peak top temperature that appears when the polytrimethylene terephthalate composition heated to the melting point or higher is cooled at a rate of 10° C./min using a differential scanning calorimeter is 165° C. or more, and that the half-width of the crystallization exothermic peak that appears when the polytrimethylene terephthalate composition heated to the melting point or higher is cooled at a rate of 10° C./min using a differential scanning calorimeter is 20° C. or less.

Incidentally, here, the present inventors have conducted research about a method for dispersing titanium dioxide at the stage of producing a polytrimethylene terephthalate composition, the stability of the production process in the production of a polyester fiber using the polytrimethylene terephthalate composition, and the crystallization exothermic peak top temperature that appears when the polytrimethylene terephthalate composition heated to the melting point or higher is cooled at a rate of 10° C./min using a differential scanning calorimeter, as well as the half-width of the crystallization exothermic peak; as a result, it has been found that they are significantly correlated. That is, because titanium dioxide whose weight distribution of particles having a particle size of more than 1.0 μm is 5.0% by weight or less in particle size distribution measurement is contained in an amount of 0.05 to 3.0% by weight in the polytrimethylene terephthalate composition, the titanium dioxide is microdispersed in the polytrimethylene terephthalate composition without excessive aggregation of titanium dioxide particles. As a result, the degree of crystallization and the crystallization speed when the polytrimethylene terephthalate composition in a molten state is cooled at a rate of 10° C./min are promoted, and the crystallization exothermic peak top temperature is increased to 165° C. or more, while the half-width of the crystallization exothermic peak is narrowed to 20° C. or less. Further, as a result, because titanium dioxide is microdispersed in polytrimethylene terephthalate without being excessively aggregated, in the process of producing a fiber by melt-spinning the polytrimethylene terephthalate composition, filter clogging during formation, yarn breakage during spinning, and the like are significantly reduced. In particular, the process of continuously producing a thin fiber having a single-fiber fineness of 2.0 dtex or less is stabilized, and further, fluffing is also significantly suppressed without decreases in the tensile strength and tensile elongation of the resulting fiber. As a result, the quality of the finally obtained fiber is improved.

That is, in the method for producing a polytrimethylene terephthalate composition of the invention, it is preferable that using a differential scanning calorimeter, the crystallization exothermic peak top temperature that appears when the polytrimethylene terephthalate composition heated to the melting point or higher is cooled is controlled at 165° C. or more, while the half-width of the crystallization exothermic peak is controlled at 20° C. or less.

In the polytrimethylene terephthalate composition production process, conventionally, quality control has been performed by analyzing intrinsic viscosity, hue, melting point, the amount of terminal carboxyl groups, and the like. However, these control items alone have been insufficient for predicting filter clogging during fiber formation by melt-spinning or yarn breakage during spinning as described above, the amount of fluffing of the obtained fiber, filter clogging during film formation by a melt-extrusion molding method using a die process, etc. PTL 1 discloses a method in which a polytrimethylene terephthalate composition is melted between cover glasses, and titanium dioxide particles dispersed in the molten polymer are observed under a microscope to count the number of aggregates having a greatest length of more than 5 μm. However, this method requires a complicated operation, and also the obtained results vary depending on the operator who performs the measurement. In addition, the dispersion state of titanium dioxide particles having a greatest length of 5 μm or less is not considered at all.

Meanwhile, according to the preferred production method of the invention, using a differential scanning calorimeter, the polytrimethylene terephthalate composition is heated to the melting point or higher and then cooled, and the resulting crystallization exothermic peak top temperature and the half-width of the crystallization exothermic peak are measured and controlled. As a result, quality control in the polytrimethylene terephthalate composition production process is facilitated, including whether the polytrimethylene terephthalate composition is unlikely to cause the above-described filter clogging, for example. In the method for producing a polytrimethylene terephthalate composition of the invention, in the case where the temperature reached during heating the polytrimethylene terephthalate composition to the melting point or higher is too low, a polymer that has not been sufficiently melted remains and serves as a factor that promotes crystallization, making it impossible to suitably perform the measurement, while in the case where the temperature reached is too high, the pyrolysis of the polytrimethylene terephthalate composition tends to be promoted. Further, it is preferable that the temperature reached during heating the polytrimethylene terephthalate composition to the melting point or higher is within a range of 250° C. to 300° C., still more preferably within a range of 260° C. to 290° C. In addition, with respect to the cooling rate when the polytrimethylene terephthalate composition is heated to the melting point or higher and then cooled, in the case where the rate is too high, the molten polytrimethylene terephthalate composition is not crystallized but solidified in an amorphous state, while when the rate is too low, the measurement tends to take too much time. It is preferable that the cooling rate when the polytrimethylene terephthalate composition is heated to the melting point or higher and then cooled is within a range of 3 to 30° C./min, still more preferably within a range of 5 to 20° C./min. At this time, the heating rate when the polytrimethylene terephthalate composition is heated to the melting point or higher is not particularly limited, but is generally within a range of 10 to 50° C./min.

That is, in the method for producing a polytrimethylene terephthalate composition of the invention, it is particularly preferable that the following requirements (a) to (d) described above are all satisfied:

(a) the intrinsic viscosity is within a range of 0.50 to 1.60 dL/g;

(b) titanium dioxide whose weight distribution of particles having a particle size of more than 1.0 μm in particle size distribution measurement using a laser diffraction/scattering particle size distribution analyzer is 5.0% by weight or less is contained in an amount of 0.05 to 3.0% by weight;

(c) the crystallization exothermic peak top temperature that appears when the polytrimethylene terephthalate composition heated to the melting point or higher is cooled at a rate of 10° C./min using a differential scanning calorimeter is 165° C. or more; and (d) the half-width of the crystallization exothermic peak that appears when the polytrimethylene terephthalate composition heated to the melting point or higher is cooled at a rate of 10° C./min using a differential scanning calorimeter is 20° C. or less.

Then, the method for producing a polyester fiber from the polytrimethylene terephthalate composition of the invention is not particularly limited, and may be a conventionally known method for melt-spinning a polyester. For example, it is preferable that a fiber is produced by melt-spinning a polyester at a temperature within a range of 240° C. to 280° C., and it is preferable that the spinning is performed at a melt-spinning speed of 400 to 5,000 m/min. When the spinning speed is within this range, the obtained fiber has sufficient strength and also can be stably wound. In addition, in the case of draw texturing, the polyester fiber is wound and then, or alternatively without being once wound, continuously drawn, whereby a drawn yarn can be obtained. Particularly in the case where a polyester long fiber is produced, it is preferable to employ a method in which the fiber is continuously drawn at a winding speed of 1,000 to 4,000 m/min without being once wound. Further, a method in which a partially oriented yarn (POY) once wound at a winding speed of 1,000 to 4,000 m/min is subjected to false-twist texturing while being drawn to 0.9 to 2.5 times the original length, and then wound, thereby giving a false-twist textured yarn (DTY), is also a useful method for the polyester fiber of the invention. In addition, in the case where the polyester fiber of the invention is produced in the form of short fibers, it is possible that a drawn yarn in tow form is cut into short fibers using a stretch-breaking machine without being once wound, and it is also possible that such short fibers are subjected to a spinning process to form a spun yarn. Further, in order to enhance the texture, it is also preferable that the polyester fiber of the invention is subjected to an alkali weight reduction treatment.

In the production of the polyester fiber of the invention, the nozzle used for spinning is not limited in shape, and it is possible to employ any of nozzles having a circular shape, an elliptical shape, a modified cross-section such as a triangular or higher polygonal shape or a multifoil shape, a solid cross-section, a hollow cross-section, and the like. In addition, it is also possible to obtain a core-sheath type, sea-island type, side-by-side type, or the like composite fiber, in which the polytrimethylene terephthalate composition of the invention is arranged as one component of the composite fiber, while another polymer is used as the other component. Examples of other polymers include polyesters other than polytrimethylene terephthalate of the invention such as polyethylene terephthalate, nylon, and polyolefins such as polyethylene, polypropylene, polystyrene, and polymethyl methacrylate. The composite fiber may also be a composite fiber, in which three or more components are arranged using the above various types of polymers. Further, as necessary, the polytrimethylene terephthalate composition or fiber of the invention may contain small amounts of additives, such as lubricants, pigments, dyes, antioxidants, solid-phase polycondensation promoters, fluorescent brighteners, antistatic agents, antimicrobials, UV absorbers, light stabilizers, heat stabilizers, and light-shielding agents, for example.

The polytrimethylene terephthalate composition of the invention can reduce the fluffing rate and yarn breakage rate particularly in the case of spinning a fiber having small fineness, that is, a thin fiber, and is suitably used in such a case. In addition, it has been made possible to effectively reduce the fluffing rate and yarn breakage rate also in the case where a modified cross-section fiber or a composite fiber is produced using the polytrimethylene terephthalate composition of the invention, or even in the case where post-processing, such as false-twist texturing, is performed.

EXAMPLES

Hereinafter, the invention will be described in further detail with reference to examples. However, the scope of the invention is not limited to these examples. Incidentally, values in the examples were measured by the following methods.

(1) Intrinsic Viscosity

The intrinsic viscosity of a polyester polymer was determined using an Ubbelohde viscometer from the viscosity value measured in an o-chlorophenol solution at 35° C.

(2) Crystallization Exothermic Peak Temperature, Half-Width

The crystallization exothermic peak temperature and half-width of a polytrimethylene terephthalate composition were measured as follows. Using a differential scanning calorimeter DSC Q20 manufactured by TA Instruments, a 10-mg sample was heated at a rate of 20° C./min from 30° C. to 280° C. in a nitrogen atmosphere. After 280° C. was reached, the sample was maintained for 2 minutes and then cooled to 50° C. at a rate of 10° C./min. With respect to the cooling crystallization temperature that appeared in the course of cooling, the peak top temperature and the peak half-width were determined. In addition, by measuring the endothermic peak top temperature during heating, the melting point of the polytrimethylene terephthalate composition can be measured, which may serve as an index to indicate that the composition under evaluation is a polytrimethylene terephthalate composition.

(3) Measurement of Titanium Dioxide Amount and Elemental Phosphorus Amount in Polytrimethylene Terephthalate Composition A sample was heated and melted to form a circular disc, and the amounts of elemental titanium and elemental phosphorus contained were quantified using a fluorescent X-ray device, Model ZSX100E, manufactured by Rigaku Corporation. The amount of titanium dioxide was determined by conversion from the quantified amount of elemental titanium.

(4) The Number of Titanium Dioxide Coarse Particles in Polytrimethylene Terephthalate Composition A 50-mg polymer was sandwiched between two cover glasses and melt-pressed at 280° C., then rapidly cooled, and observed under a phase contrast microscope. Using an image analyzing device Luzex 500 manufactured by Japan Regulator Co., Ltd., the number of particles having a greatest length of 5.0 μm or more in the microscope image was counted.

(5) Particle Size Distribution of Titanium Dioxide

A prepared titanium dioxide/trimethylene glycol slurry was subjected to the measurement of particle size distribution using a laser diffraction/scattering particle size distribution analyzer LA-950 manufactured by HORIBA, Ltd. From the measured data, the weight proportion of particles having a particle size of more than 1.0 μm was determined.

(6) Dynamic Characteristics of Polyester Fiber (Tensile Strength, Tensile Elongation)

Measurement was performed in accordance with JIS L-1070.

(7) Single-Fiber Fineness of Polyester Fiber

A 100-m polyester fiber was wound on a sizing reel, and the fineness (dtex) was determined from its weight. The fineness was then divided by the number of filaments in single multifilament yarn and defined as the single-fiber fineness.

(8) Yarn Breakage Rate of Polyester Fiber

A fiber was wound to form 100 multifilament packages. The proportion of packages, in which yarn breakage occurred, making it impossible to complete winding into a 3-kg package, was evaluated as the yarn breakage rate.

(9) Fluffing Rate of Polyester Fiber

A fiber was wound to form 100 multifilament packages. The number of packages having fluff on the wound fiber surface was counted, and the proportion of such packages was defined as the fluffing rate.

(10) Filtration Pressure Increase Rate in Polyester Fiber Production Process

In order to evaluate the impact of the presence of coarse particles in a polytrimethylene terephthalate composition, the filtration pressure increase rate was evaluated by the following operation. A wire mesh filter was installed in the spinneret of a polyester volumetric feeder attached to the molten polyester exit side of a small-sized single-screw extruder. Next, while controlling the temperature of the molten polyester and the flow rate of the molten polyester to be constant, melt-spinning was continuously performed for three days. The pressure on the pressure meter provided in the spinneret at this time was recorded, and the increase rate of the pressure value after three days relative to the pressure value in the beginning of melt-spinning was determined.

(11) Primary Chemical Structure (Structure of Repeating Unit of Polyester)

The chemical structure of the repeating unit of the polyester portion of an obtained polyester composition was calculated by dissolving a polyester composition sample in a suitable solvent, and measuring the 1H-NMR spectrum at 600 MHz using JEOLA-600 manufactured by JEOL.

(12) Observation of Fiber Cross-Sectional Shape in Direction Perpendicular to Fiber Axis The obtained fiber sample was cut in the direction perpendicular to the fiber axis, and the cut surface was observed under an optical microscope to observe the cross-sectional shape of the composite fiber. From the cross-sectional shape, the modification ratio was evaluated.

Reference Example 1

In a mixer equipped with a helical stirring blade, titanium dioxide HOMBITAN LW-S manufactured by Sachtleben Chemie (anatase-form, average particle size: 0.3 μm) was mixed with trimethylene glycol for 1 hour to prepare a titanium dioxide slurry having a titanium dioxide concentration of 50% by weight. The slurry was introduced into Agitator Bead Mill LME 30 manufactured by NETZSCH-Feinmahltechnik filled with glass beads having an average particle size of 0.8 mm as grinding media. The slurry was wet-ground twice while circulating the slurry in the device, and trimethylene glycol was added to dilute the slurry to a titanium dioxide concentration of 20% by weight. The treatment conditions during the grinding treatment were as follows: treatment temperature: 58 to 62° C., rotation speed: 3,000 to 3,100 ppm, flow rate: 31 to 32 kg/h. Subsequently, the particle size distribution of titanium dioxide in the slurry was measured. The obtained results are shown in Table 1.

Reference Example 2

The same procedure as in Reference Example 1 was performed, except that the slurry was wet-ground three times while circulating the slurry in the device. The obtained results are also shown in Table 1.

Reference Example 3

The same procedure as in Reference Example 1 was performed, except that as titanium dioxide, KRONOS KA-30 (anatase-form, average particle size: 0.2 to 0.4 μm) manufactured by Titan Kogyo, Ltd., was used. The obtained results are also shown in Table 1.

Reference Example 4

The same procedure as in Reference Example 1 was performed, except that the slurry was wet-ground once. The obtained results are also shown in Table 1.

Reference Example 5

The same procedure as in Reference Example 1 was performed, except that glass beads having an average particle size of 0.5 mm were used as grinding media. The obtained results are also shown in Table 1.

Reference Example 6

The same procedure as in Reference Example 1 was performed, except that glass beads having an average particle size of 1.5 mm were used as grinding media. The obtained results are also shown in Table 1.

Example 1

Trimethylene glycol was dispersed at a molar ratio of 2.3 relative to terephthalic acid, then continuously fed to a continuous esterification reaction device capable of distilling water and trimethylene glycol steam, and, while being allowed to react slowly, heated to 250° C. to cause pre-polymerization. Subsequently, tetra-n-butoxytitanium, trimethyl phosphate, and the titanium dioxide slurry prepared in Reference Example 1 were continuously added to the obtained reaction product in amounts of 0.08% by weight, 0.01% by weight, and 0.3% by weight (as titanium dioxide), respectively, relative to the finally obtained polytrimethylene terephthalate composition. While making the addition, the mixture was fed to a continuous polymerization reaction device. The reaction mixture was slowly heated and depressurized to remove excess trimethylene glycol to a final temperature of 265° C. and a final pressure of 70 Pa or less. At the time when an intrinsic viscosity of 0.96 dL/g was reached, the reaction mixture was extruded from the reactor and pelletized with a strand cutter. With respect to the pelletized polytrimethylene terephthalate composition, the intrinsic viscosity, the crystallization exothermic peak temperature and half-width, the amount of titanium dioxide, the amount of elemental phosphorus, and the number of titanium dioxide coarse particles were measured. The obtained results are shown in Table 2.

The obtained pellets were pre-crystallized and dried at 110° C. for 8 hours. Using an extrusion-spinning machine including a spin pack having attached thereto a spinneret provided with a 400-mesh wire mesh filter, a packsand, and 72 circular spinning openings having a diameter of 0.27 mm, the pellets were melted at 265° C. and extruded at a flow rate of 28 g/min. Then, the extruded molten polymer was cooled and solidified with cooling air blown across the yarn from a lateral-blow cylindrical cooling device. While feeding an oil agent from a guide-type oil feeder, the filaments were bundled using the guide of the guide-type oil feeder. Subsequently, the multifilament was entangled using an air nozzle (entanglement treatment), then wound around a first rotary roller heated to 55° C. and rotating at 1,900 m/min, and wound around a second rotary roller heated to 130° C. and rotating at 3,150 m/min. Subsequently, on a winder at a winding speed of 3,000 m/min, a 3-kg polyester fiber multifilament package was wound. In the case where yarn breakage occurred before the completion of winding into a 3-kg package, winding was finished then, and the winding of another package was started. The fineness, the dynamic characteristics, and the number of fluffs of the wound fiber were measured. The results are shown in Table 3.

Examples 2 and 3, Comparative Examples 1 to 3

The same procedure as in Example 1 was performed, except that the titanium dioxide slurry used in Example 1 was changed from the slurry of Reference Example 1 to the slurries of Reference Examples 2 to 6 as Examples 2 and 3 and Comparative Examples 1, 2, and 3 respectively. The results are shown in Table 2 and Table 3.

Example 4

Figure 2:
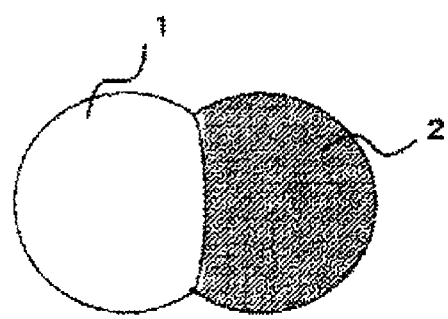
FIG. 2 shows a fiber cross-sectional shape of the polyester composite fiber of the invention in the direction perpendicular to the fiber axis.

The polytrimethylene terephthalate composition pellets obtained in Example 1 and pellets of polyethylene terephthalate having an intrinsic viscosity of 0.52 dL/g were melted using an extruder. Melting was performed at 265° C. for polytrimethylene terephthalate and at 285° C. for polyethylene terephthalate. Subsequently, the temperatures of the two polymers were both set at 270° C., and the polymers were extruded at a composite ratio of 50:50, that is, each at a discharge rate of 10.6 g/min, through a known composite spinneret shaped to give a fiber cross-sectional shape with a modification ratio of 1.4 and provided with 72 outlets having an outlet diameter of 0.29 mm, as shown in FIG. 2.

After extrusion, the molten polymers fused immediately below the nozzle surface were cooled and solidified with cooling air blown across the yarn from a lateral-blow cylindrical cooling device. While feeding an oil agent from a guide-type oil feeder, filaments were bundled using the guide of the guide-type oil feeder. Subsequently, the multifilament was entangled using an air nozzle (entanglement treatment), wound around a first rotary roller heated to 58° C. and rotating at 1,450 m/min, then wound around a second rotary roller heated to 180° C. and rotating at 4,250 m/min, and entangled again using an air nozzle. Then, on a winder at a winding speed of 4,050 m/min, a 3-kg composite fiber multifilament package was wound. In the same manner as in Example 1, in the case where yarn breakage occurred before the completion of winding into a 3-kg package, winding was finished then, and the winding of another package was started. The fineness, the dynamic characteristics, and the number of fluffs of the wound composite fiber were measured. The results are shown in Table 4. Here, the modification ratio means the length ratio of the longer side to the shorter side (longer side length/shorter side length) of the circumscribed rectangle of a fiber cross-sectional shape in the direction perpendicular to the fiber axis.

Comparative Example 4

The same procedure as in Example 4 was performed, except that the polytrimethylene terephthalate composition pellets used in Example 4 were changed to those prepared in Comparative Example 1. That is, as a titanium dioxide slurry, the slurry prepared in Reference Example 4 was used. The results are also shown in Table 4.

TABLE 1

|  | Kind of Titanium Dioxide | Particle Size of Grinding Media (mm) | Grinding Times (the number of times) | Weight Proportion of Particles with Particle Size of More Than 1 μm (%) |
|---|---|---|---|---|
| Reference Example 1 | A | 0.8 | 2 | 0.4 |
| Reference Example 2 | A | 0.8 | 3 | 0.2 |
| Reference Example 3 | B | 0.8 | 2 | 0.3 |
| Reference Example 4 | A | 0.8 | 1 | 5.6 |
| Reference Example 5 | A | 0.5 | 2 | 5.2 |
| Reference Example 6 | A | 1.5 | 2 | 7.4 |

A: "HOMBITAN LW-S"
B: "KRONOS KA-30"

TABLE 2

|  | Slurry Used | Intrinsic Viscosity (dL/g) | Crystallization Exothermic Peak Temperature (° C.) | Crystallization Exothermic Peak Half-Width (° C.) | Titanium Dioxide Amount (% by weight) | Elemental P Amount (ppm by weight) | TiO₂ Coarse Particles of 5 μm or More (the number of particles) |
|---|---|---|---|---|---|---|---|
| Example 1 | Reference Example 1 | 0.962 | 170 | 12 | 0.31 | 11 | 2 |
| Example 2 | Reference Example 2 | 0.961 | 175 | 9 | 0.30 | 10 | 1 |
| Example 3 | Reference Example 3 | 0.958 | 172 | 10 | 0.30 | 12 | 2 |
| Comparative Example 1 | Reference Example 4 | 0.960 | 153 | 34 | 0.31 | 10 | 4 |
| Comparative Example 2 | Reference Example 5 | 0.962 | 155 | 28 | 0.30 | 11 | 2 |
| Comparative Example 3 | Reference Example 6 | 0.959 | 156 | 40 | 0.31 | 10 | 21 |

TABLE 3

|  | Single-fiber Fineness (dtex) | Tensile Strength (cN/dtex) | Tensile Elongation (%) | Fluffing Rate (%) | Package Pressure Increase Rate (%) | Yarn Breakage Rate (%) |
|---|---|---|---|---|---|---|
| Example 1 | 1.2 | 2.9 | 62 | 1 | 25 | 0 |
| Example 2 | 1.2 | 3.0 | 62 | 0 | 18 | 0 |
| Example 3 | 1.2 | 3.0 | 61 | 0 | 22 | 0 |
| Comparative Example 1 | 1.2 | 2.9 | 63 | 33 | 56 | 14 |
| Comparative Example 2 | 1.2 | 3.0 | 60 | 25 | 50 | 10 |
| Comparative Example 3 | 1.2 | 2.8 | 64 | 49 | 60 | 17 |

TABLE 4

|  | Used PTT* Composition | Single-fiber Fineness (dtex) | Tensile Strength (cN/dtex) | Tensile Elongation (%) | Fluffing Rate (%) | Package Pressure Increase Rate (%) | Yarn Breakage Rate (%) |
|---|---|---|---|---|---|---|---|
| Example 4 | Example 1 | 1.6 | 3.8 | 32 | 4 | 32 | 2 |
| Comparative Example 4 | Comparative Example 1 | 1.6 | 3.7 | 34 | 16 | 48 | 13 |

PTT*: Polytrimethylene terephthalate

As is clear from Table 3, in the process of melt-spinning the polytrimethylene terephthalate composition of the invention, the spinning yield was high, and the pack pressure increase was small. Accordingly, the spinning process was stabilized, and also the obtained fiber was of high quality with almost no fluffing.

INDUSTRIAL APPLICABILITY

The invention makes it possible to provide a polytrimethylene terephthalate composition which stabilizes the post-process such as the production of a fiber, whereby a polyester fiber having small single-fiber fineness and of high quality, in particular, can be easily obtained.

REFERENCE SIGNS LIST

1: Component composed of the polytrimethylene terephthalate composition of the invention
2: Component composed of a resin other than the polytrimethylene terephthalate composition of the invention

The invention claimed is:

1. A polytrimethylene terephthalate composition comprising a polyester having a trimethylene terephthalate unit as a main repeating unit,
the polytrimethylene terephthalate composition satisfying all the following requirements (a) to (e):
(a) the intrinsic viscosity is within a range of 0.50 to 1.60 dL/g;
(b) titanium dioxide whose weight distribution of particles having a particle size of more than 1.0 μm in particle size distribution measurement using a laser diffraction/scattering particle size distribution analyzer is 5.0% by weight or less is contained in an amount of 0.05 to 3.0% by weight;
(c) the crystallization exothermic peak top temperature that appears when the polytrimethylene terephthalate composition heated to the melting point or higher is cooled at a rate of 10° C./min using a differential scanning calorimeter is 165° C. or more;
(d) the half-width of the crystallization exothermic peak that appears when the polytrimethylene terephthalate composition heated to the melting point or higher is cooled at a rate of 10° C./min using a differential scanning calorimeter is 20° C. or less; and
(e) the titanium dioxide is in anatase form.

2. The polytrimethylene terephthalate composition according to claim 1, having an elemental phosphorus content of 3 to 100 ppm by weight.

3. A polyester fiber comprising the polytrimethylene terephthalate composition according to claim 1.

4. A polyester composite fiber comprising the polytrimethylene terephthalate composition according to claim 1 as at least one component.

5. A method for producing a polytrimethylene terephthalate composition, characterized in that
titanium dioxide is subjected to a wet-grinding treatment to form a titanium dioxide slurry whose weight content of titanium dioxide particles having a particle size of more than 1.0 μm is 5.0% by weight or less, wherein the titanium dioxide is in anatase form, and
then the titanium dioxide slurry is added to a polytrimethylene terephthalate composition having a trimethylene terephthalate unit as a main repeating unit, thereby making the titanium dioxide concentration in the composition 0.05 to 3.0% by weight, and the intrinsic viscosity of the polytrimethylene terephthalate composition after polymerization within a range of 0.50 to 1.60 dL/g,
wherein when a differential scanning calorimeter is used, the crystallization exothermic peak top temperature that appears when the polytrimethylene terephthalate composition heated to the melting point or higher is cooled is controlled at 165° C. or more, while the half-width of the crystallization exothermic peak is controlled at 20° C. or less.

6. The method for producing a polytrimethylene terephthalate composition according to claim 5, wherein an organic titanium compound is used as a polymerization catalyst.

7. The method for producing a polytrimethylene terephthalate composition according to claim 5, wherein the titanium dioxide has an average particle size within a range of 0.1 to 0.8 μm before the wet-grinding treatment.

8. The method for producing a polytrimethylene terephthalate composition according to claim 5, wherein the titanium dioxide slurry is obtainable by dispersing a powder of titanium dioxide in trimethylene glycol.

9. The method for producing a polytrimethylene terephthalate composition according to claim 5, wherein the polytrimethylene terephthalate composition is a polytrimethylene terephthalate composition comprising a polyester having a trimethylene terephthalate unit as a main repeating unit,
the polytrimethylene terephthalate composition satisfying all the following requirements (a) to (d):
(a) the intrinsic viscosity is within a range of 0.50 to 1.60 dL/g;
(b) titanium dioxide whose weight distribution of particles having a particle size of more than 1.0 μm in particle size distribution measurement using a laser diffraction/scattering particle size distribution analyzer is 5.0% by weight or less is contained in an amount of 0.05 to 3.0% by weight;
(c) the crystallization exothermic peak top temperature that appears when the polytrimethylene terephthalate composition heated to the melting point or higher is cooled at a rate of 10° C./min using a differential scanning calorimeter is 165° C. or more; and
(d) the half-width of the crystallization exothermic peak that appears when the polytrimethylene terephthalate composition heated to the melting point or higher is cooled at a rate of 10° C./min using a differential scanning calorimeter is 20° C. or less.

10. A method for producing a polyester fiber, characterized by comprising melt-spinning the polytrimethylene terephthalate composition according to claim 1.

11. A polyester fiber comprising the polytrimethylene terephthalate composition according to claim 2.

12. A polyester composite fiber comprising the polytrimethylene terephthalate composition according to claim 2 as at least one component.

13. The method for producing a polytrimethylene terephthalate composition according to claim 6, wherein the titanium dioxide has an average particle size within a range of 0.1 to 0.8 μm before the wet-grinding treatment.

14. A method for producing a polyester fiber, characterized by comprising melt-spinning the polytrimethylene terephthalate composition according to claim 2.

* * * * *